United States Patent
Modi et al.

(10) Patent No.: US 7,502,333 B2
(45) Date of Patent: Mar. 10, 2009

(54) PRE-CONFIGURED TOPOLOGY WITH CONNECTION MANAGEMENT

(75) Inventors: Prashant Modi, Pleasanton, CA (US); Kathryn Hampton, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 805 days.

(21) Appl. No.: 10/806,628

(22) Filed: Mar. 23, 2004

(65) Prior Publication Data

US 2005/0213608 A1 Sep. 29, 2005

(51) Int. Cl.
*H04L 12/28* (2006.01)
(52) U.S. Cl. .................. 370/255; 709/224
(58) Field of Classification Search ......... 370/254–258, 370/351, 352, 463, 468, 469; 709/202, 206, 709/224
See application file for complete search history.

(56) References Cited

U.S. PATENT DOCUMENTS

| | | | |
|---|---|---|---|
| 6,009,466 A | 12/1999 | Axberg et al. | |
| 6,134,591 A | 10/2000 | Nickles | |
| 6,229,540 B1 | 5/2001 | Tonelli et al. | |
| 6,442,144 B1 | 8/2002 | Hansen | |
| 6,647,387 B1 | 11/2003 | McKean et al. | |
| 6,658,454 B1 * | 12/2003 | Delany et al. | 709/202 |
| 2003/0005092 A1 | 1/2003 | Nelson | |
| 2004/0093411 A1 * | 5/2004 | Elzur et al. | 709/224 |
| 2005/0154825 A1 * | 7/2005 | Fair | 711/113 |

FOREIGN PATENT DOCUMENTS

| | | |
|---|---|---|
| EP | 0490624 A2 | 6/1992 |
| EP | 0809383 | 11/1997 |
| GB | 2333427 A | 7/1999 |
| JP | 2001/053776 | 2/2001 |
| WO | WO 01/88908 | 11/2001 |
| WO | WO 01/98930 A2 | 12/2001 |
| WO | WO 02/099571 | 12/2002 |

OTHER PUBLICATIONS

British Patent Office; Patent Search Report for Appl. GB0505871.4; dated Jul. 14, 2005.
British Patent Office; Patent Search Report for Appl. GB0505871.4; dated Oct. 7, 2005.

* cited by examiner

*Primary Examiner*—Seema S Rao
*Assistant Examiner*—Wanda Z Russell

(57) ABSTRACT

Systems, methodologies, media, and other embodiments associated with pre-configured topology connection management are described. One exemplary system embodiment includes an interface logic configured to acquire information about a set of client nodes, to pre-configure a subset of the client nodes into a pre-configured topology, and to make available information about the pre-configured topology. The exemplary system may also include a logic for mapping a resource to a port through which it can be accessed and a logic for determining whether a requestor will be granted a connection to the machine on which the resource resides based, at least in part, on membership in the pre-configured topology. Membership in the pre-configured topology may be determined by a connection management logic analyzing a node identifier provided by the requestor in a request related to accessing the resource.

36 Claims, 9 Drawing Sheets

PRE-CONFIGURED TOPOLOGY WITH CONNECTION MANAGEMENT

BACKGROUND

A data communications component like a NIC (network interface card) or a remote direct memory access (RDMA) NIC (RNIC) may have limited resources like ports, memory, connections, licenses, processor cycles, and so on. Undesired (e.g., unauthorized) consumption of these limited resources may negatively impact data communication functionality provided by the data communications component. For example, while an RNIC may be designed to support RDMA, if resources that support RDMA are unavailable due to undesired consumption, then the RDMA feature may be unavailable. Similarly, while an (R)NIC may support off-loading protocol handling, if resources that support protocol off-loading are consumed, then the feature may not be available. Furthermore, once the resources are consumed by an undesired connection, like that established during a denial of service (DoS) attack, it may be difficult, if possible at all, to reclaim those resources.

Protocol off-loading is an RNIC feature that facilitates moving processing associated with handling networking protocol services from a first component (e.g., server motherboard processor) to an RNIC. Rather than a computer's central processing unit (CPU) being responsible for protocol services like accounting for missing packets, connection establishment, (en)decryption, routing, and so on, the processing can be moved to a processor on an RNIC. The RNIC may provide services for several layers of a protocol (e.g., physical, data link, network, transport), leaving the first component more resources (e.g., memory, processor cycles) to handle other concurrent tasks, thereby improving overall functionality in the component from which the protocol was off-loaded. Thus, a server may benefit from protocol off-loading and other services provided by an RNIC (e.g., RDMA) when the resources on the RNIC are managed in a manner that prevents undesired consumption of those resources. While protocol off-loading and RDMA are described, it is to be appreciated that other data communication and networking functions can be negatively impacted by undesired resource consumption.

In some network protocols that employ TCP/IP (Transmission Control Protocol/Internet Protocol) a port is a logical endpoint. A port may be used by a client to specify a specific server program with which it desires to interact or a specific server resource it wishes to access. For example, a port may be associated with a protocol off-loading service that provides a logical connection to a communicating node. To facilitate making connections between communicating nodes over a computer network via ports, some ports may have numbers and/or addresses that are pre-assigned. These types of ports may be called "well-known ports" and the first actions taken when establishing a connection may involve these well-known ports.

One well-known port may be associated with a port mapping logic (e.g., a port mapper) that facilitates finding and/or interacting with an available service like an off-loaded protocol service. A port mapper may be implemented in software, firmware, hardware, and combinations thereof. A port mapper may map a resource, program, service, and so on to a transport-specific port number that can be made known to a requesting client via mapping data distributed in response to a request for mapping data. This facilitates a client dynamically binding to, using, and/or communicating with the mapped programs, services, resources, and so on. However, unprotected distribution of mapping data can lead to undesired consumption of limited networking resources.

A requesting client may communicate with a port mapper that is listening at a well-known port to request mapping data concerning with which server port a resource is associated. For example, a requesting client may request information concerning a port at which an off-loaded protocol is available. The requesting client may receive the port/resource mapping data from the port mapper and then request that a connection be established to that port. However, not all connections are desirable and some may be conceived with malicious intent. For example, a DoS attack may be based on exploiting the fact that an RNIC may only be able to off-load a certain number of connections. If the DoS attack can acquire those off-loaded connections, then no connections may be left for desired interactions.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
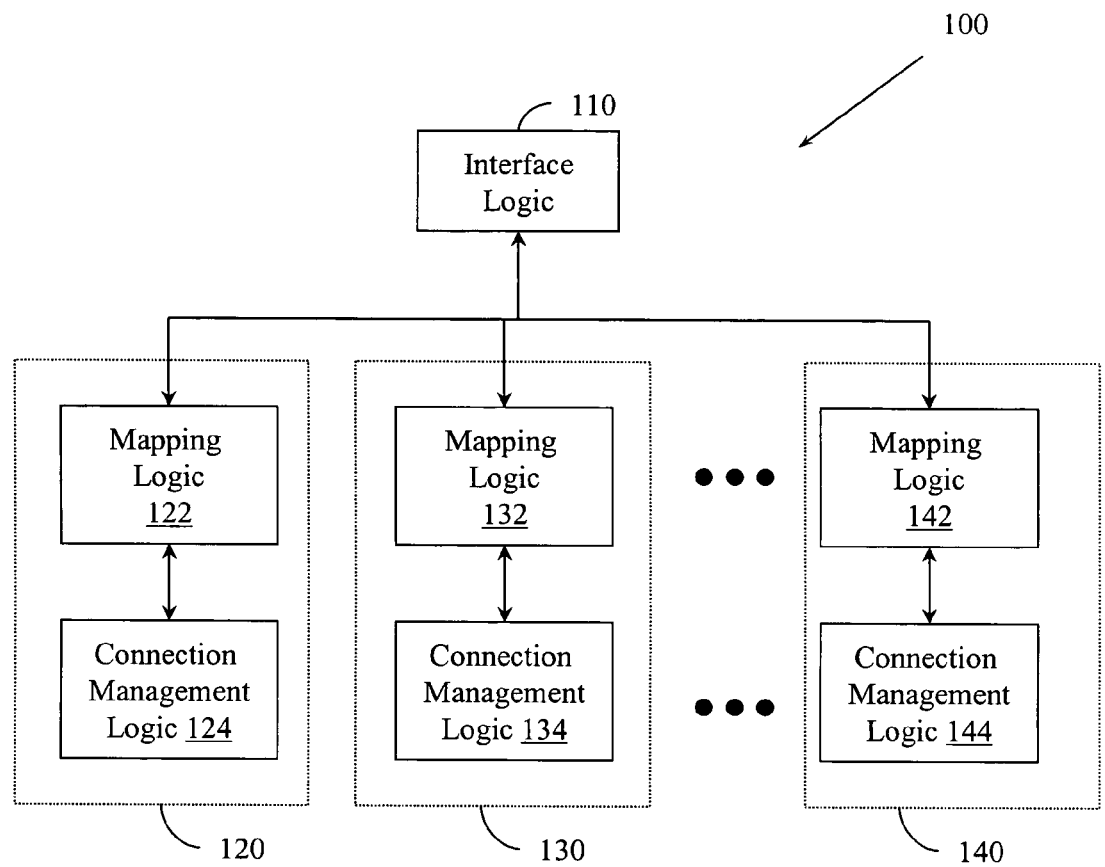
FIG. 1 illustrates an example system for establishing a pre-configured topology.

Example systems and methods illustrate group membership-based connection management for nodes in a pre-configured topology. "Topology", as used herein (e.g., topology of nodes, pre-configured topology), refers to a related set of nodes configured to be able to communicate with other members of the set using a computer network. A topology may be pre-configured using, for example, an administrative interface implemented in a graphic user interface (GUI), a scripting technique, a policy-based technique, and/or other techniques that facilitate centralized and/or distributed administration. In one example, a topology may also be dynamically re-configured through the administrative interface and/or as a result of automated processes. Configuring the topology may include determining group membership, establishing privileges for a group member, determining preferred and/or backup routing paths for nodes, and the like. In one example, membership may be monitored by analyzing identifiers like a NIC hardware identifier, an IP address, a group membership token, a user-entered password, and so on. In another example, physical ports and logical addresses associated with the physical ports may be individually mapped to a topology. In some examples, a topology may be established through the administrative interface using techniques including, but not limited to, manually, programmatically controlled, and the like.

Example systems and methods illustrate creating a pre-configured topology that facilitates establishing connections between member nodes in a manner that facilitates limiting undesired consumption of resources like memory, licenses, connections, processor cycles, and so on. The connections may employ a specific protocol within an open network and exclude other nodes over that protocol on that network. In one example, if protocol off-load capability is available over the specific protocol, then example systems and methods may provide options that would allow actions including, but not limited to, enabling a protocol off-load capability, aging off-loaded connections on a system-wide or per application basis, and converting idle connections to a non-off-loaded mode. Converting idle resources to a non-off-loaded mode facilitates recovering resources (e.g., memory, connections, processor cycles) that can then be used by active connections.

Some networking protocols may leave resources vulnerable to consumption by unauthorized connections as occurs, for example, in a DoS attack. To reduce this vulnerability, membership in an administratively controlled pre-configured topology can be implemented for nodes that wish to communicate via the otherwise vulnerable protocol. In one example, nodes, and/or ports associated with those nodes may belong to multiple topologies. Address translators like port mappers on the nodes can act as a clearing house or "traffic cop" for connection access. By way of illustration, communication between nodes within a topology may be enabled when they are administratively added to the topology. Logic associated with the administrative interface will therefore be tasked with notifying topology members of the addition of a node and/or port. Nodes that have been added to a topology may be allowed access to a protected member node or resource while nodes that have not been added or that have been removed may be prevented from establishing a connection to a protected node using a certain protocol. Thus, logic associated with the administrative interface will therefore also be tasked with notifying members of the deletion of a node and/or port.

Fallback processing (e.g., processing over a secondary protocol when the desired protocol is not available) may allow an unauthorized node to communicate with a member of the pre-configured topology using a different networking protocol. A connection made using the fallback networking protocol may not provide the same access to a resource that is available via the networking protocol preferred by the members. Thus, example systems and methods allow nodes within an open network, when using a specific networking protocol, to be assigned membership in a topology that allows the set of nodes to establish connections to one another over the networking protocol, while excluding nodes that are not a part of the topology. The example systems and methods may employ a mapping logic to grant or deny access during operation (e.g., while interacting with a mapping logic or connection management logic). Which nodes are to be granted or denied access can be controlled through an interface logic that communicates with a mapping logic In one example, the mapping logic performs session layer connection management associated with granting or denying access in the member-preferred networking protocol.

Protection against unauthorized use like that encountered during a DoS attack is one use of pre-configured topology connection management. Selectively controlling whether nodes are allowed to communicate via a specific higher level protocol when there is no other physical or logical barrier may be another use. For example, whether a node in a pre-configured topology may communicate via a specific port and/or protocol may be controlled based on time-of-day, load, current number of users, maintenance schedules, and the like. Thus, pre-configured topology connection management may provide a fine grained control over resources associated with a data communication component like an RNIC. The fine granularity may facilitate, for example, blocking access via a first protocol/port/card to a first resource (e.g., database, RDMA memory, off-loaded protocol connection) while permitting access via a second protocol/port/card to a second resource through fallback processing. Additionally, and/or alternatively, the fine granularity may facilitate blocking access to the first resource via the first protocol, but may allow, for example, gathering information about why the access was blocked via a second protocol. This may be employed, for example, when access is blocked due to load restrictions rather than to the request being denied for not being a member of a pre-configured topology. By way of illustration, since some resources may be managed on a per RNIC basis, resource conservation techniques may make some resources temporarily unavailable to an otherwise authorized requester (e.g., requestor who is member of pre-configured topology). If information about the reason for the denial is available to the otherwise authorized requestor, then that requestor may take actions like trying again later, seeking a connection to a similar resource available via a different RNIC, and so on.

The interface logic may provide other administrative options. For example, the interface logic may facilitate controlling selective RDMA enablement where an RDMA path may be enabled on a Registry managed, per-application basis. Similarly, the administrative interface may facilitate controlling connection conversion to non-RDMA mode. This may be an alternative to idle connection termination. This option may facilitate, for example, coordinating a passive connection through an off-loaded protocol on a component that supports RDMA connections.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates a system 100 for establishing a pre-configured topology. The system 100 may include an interface logic 110 for pre-configuring a topology of nodes to communicate via a preferred networking protocol. Networking protocol, as used herein, refers to the set of rules, processes, data structures, conventions, standards, logics, and so on by which signals are conveyed across a computer network. The nodes (e.g., nodes 120, 130, . . . , 140) may include mapping logics and connection management logics. Nodes, as used herein, refers to computerized entities that may communicate across a computer network. Thus, nodes may include, for example, computers, printers, telephones, and so on. While mapping logics and connection logics are shown separately, it is to be appreciated that a mapping logic and a connection logic may be implemented in a single logic. A first node 120 may include a mapping logic 122 and a connection management logic 124, a second node 130 may include a mapping logic 132 and a connection management logic 134, and so on.

The interface logic 110 may facilitate pre-configuring a topology of nodes. Pre-configuring a topology of nodes may include, for example, acquiring node identifiers from a set of nodes. The node identifiers facilitate recording and later identifying whether a node is a member of a pre-configured topology. The node identifiers may be, for example, an IP address, a value stored in NIC hardware, firmware, and/or software, a value stored in RNIC hardware, firmware, and/or software, a password, a value stored on a USB (Universal Serial Bus) token, and so on. While the form of the identifier may vary, the identifier uniquely identifies a node (e.g., computer, printer, telephone), and/or a port on the node. The node will make the identifier available to a member of the topology when the node wishes to communicate with the member using the preferred networking protocol. In one example, the preferred networking protocol may include a TCP transport layer and an IP network layer.

Pre-configuring the topology may also include, for example, the interface logic 110 acquiring a topology configuration choice data concerning how the pre-configured topology is to be configured. In one example, the configuration choice data may be received from a human user via a GUI. While a GUI is described, it is to be appreciated that in other examples configuration choice data may be received via scripting-based techniques, policy-based techniques, programmatic techniques, and so on. The configuration choice data may describe items including, but not limited to, preferred networking protocol(s), preferred communication path(s), desired node characteristics (e.g., packet size, memory size, processor speed), fallback protocol(s), fallback path(s), resource management decisions, and so on.

Pre-configuring the topology may also include determining which nodes are members of the topology, establishing a preferred computer networking protocol to be employed by members of the topology, establishing a preferred path to be employed for data communications between members of the topology, establishing a fallback computer networking protocol to be employed by members of the topology, and establishing a fallback path to be employed for data communications between members of the topology. If a member of the topology seeks to communicate with another member, and the request is denied, then the member may request a connection via the fallback protocol and path. Similarly, if a node that is not a member of the topology seeks to communicate with a member of the topology using the preferred protocol and/or path(s), then the request is likely to be denied. However, the non-member node may still be able to acquire limited access to the node and/or resource through the fallback protocol and/or path(s).

The interface logic 110 may also provide a topology data concerning the topology to a member of the topology. For example, the topology data may be available to the mapping logics 122, 132 and so on, and/or available to the connection management logics 124, 134, and so on. In one example, the interface logic 110 distributes the data to the mapping logics and/or connection logics while in another example the mapping logics and/or connection logics pull the topology data from the interface logic 110.

The system 100 may also include, on member nodes, a mapping logic (e.g., 122, 132, 142) that is operably connected to the interface logic 110. A mapping logic may be configured to produce a mapping between a resource located on a server node and a port located on the server node. The resource may support, for example, RDMA between the client node and the server node, and protocol off-loading at the server node. In one example, the mapping logic may be a port mapper configured to listen on a well-known port for one or more of, a request for mapping data, and a connection request. A mapping logic may be configured to selectively provide to a client node a mapping data that describes the mapping between the resource and the port. Thus, upon receiving a request for mapping data, the mapping logic may, under the control of a connection management logic, decide whether to provide the requested mapping data to the client. For example, if a request does not include a node identifier that indicates that the requesting client node is a member of a pre-configured topology to which the server node belongs or if a client node identifier that is available to the server node does not satisfy the server node that the client node is a member of its pre-configured topology, then the mapping logic may not provide the mapping data.

A mapping logic may also be configured to selectively establish a connection between nodes, where the connection facilitates a client node accessing a resource on a server node through the port using the preferred networking protocol. Thus, upon receiving a request to establish a connection, a mapping logic may, under the control of a connection management logic, decide whether to establish the connection. For example, if a connection request includes a node identifier that indicates that the requesting node is a member of a pre-configured topology to which the server node belongs, then the mapping logic may establish the connection. In one example, the mapping logic may be further configured to facilitate establishing a fallback connection between a client node and a server node. The fallback connection may employ a second fallback networking protocol that is different from the preferred networking protocol. "Fallback connection", as used herein refers to a second chance connection that may be attempted after a primary desired connection protocol and/or path has been denied. The client node may request the fallback connection after the mapping logic has been controlled to not provide the mapping data to the client node or the mapping logic has been controlled to prevent the establishment of a connection between the server node and the client node according to the first networking protocol.

The system 100 may also include a connection management logic (e.g., 124, 134, 144) operably connected to a mapping logic (e.g., 122, 132, 142) and the interface logic 110. A connection management logic may be configured to control whether a mapping logic will provide mapping data to a requesting node and/or whether a mapping logic will establish a requested connection. In one example, a connection management logic may exert its control based, at least in part, on the topology data provided by the interface logic 110 and a node identifier received from a client node. The topology data may describe, for example, which nodes are members of the topology, a preferred computer networking protocol to be employed by members of the topology, a preferred path to be employed for data communications between members of the topology, a fallback computer networking protocol to be employed by members of the topology, and a fallback path to be employed for data communications between members of the topology.

In one example, a connection management logic may operate at a session layer associated with the preferred networking protocol and may exert its control based on analyzing the topology data and one or more of, time of day, network traffic, load, and resource availability.

In one example, the interface logic 110 may be further configured to provide a resource management data. The resource management data may facilitate controlling whether a connection between nodes will be established based on an additional criterion after topology membership has been established. Thus, the resource management data may be associated with actions like enabling protocol off-load capability, aging off-loaded connections, converting idle connections to a non-off-load mode, converting connections to and/or from RDMA mode, and the like.

Figure 2:
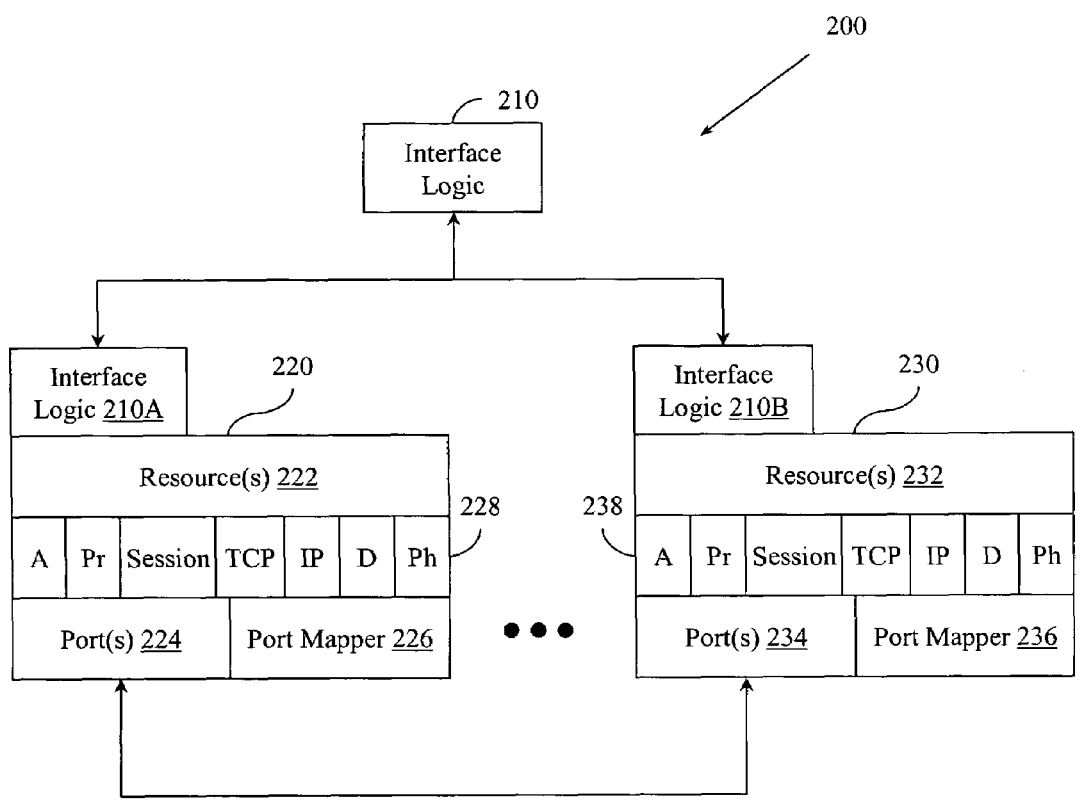
FIG. 2 illustrates an example system for establishing a pre-configured topology with session layer connection management.

FIG. 2 illustrates an example system 200 for establishing a pre-configured topology with session layer connection management. The system 200 may include a central interface logic 210 and/or distributed interface logics 210A, 210B, and so on. The interface logic 210 may be operably connected to nodes like node 220 and node 230. Node 220 may include a resource(s) 222 and a port(s) 224. A mapping between the resource 222 and the port 224 can be made, for example, by a port mapper 226. Port mapper 226 may also act as a first line of defense that determines whether to selectively distribute data concerning the mapping between the resource 222 and the port 224.

Node 220 may include a seven layer networking protocol 228 that includes a session layer at which connection management functions may be performed. The protocol 228 may also include a TCP and an IP layer. While a seven layer protocol 228 is illustrated, it is to be appreciated that member nodes may communicate using protocols with a greater and/or lesser number of layers. The connection management functions and/or decisions made in the port mapper 226 and/or the session layer may determine whether a connection will be established between node 230 and node 220 using the protocol 228. If node 230 cannot establish that it is a member of a pre-configured topology to which node 220 belongs by, for example, providing a unique node identifier that has been made known to node 220 through the interface logic 210, then the connection using the protocol 228 may not be established.

However, node 230 may be able to establish a fallback connection to node 220. Using the fallback connection, node 230 may be able to communicate with node 220, however it may not be able to employ the protocol 228 that is available to pre-configured topology member nodes and/or may not be able to access resource 222 through port 224.

In one example like that illustrated in FIG. 1, the interface logic 210 may be centralized while in another example like that illustrated in FIG. 2, the interface logic 210 may be distributed between member nodes. Thus, administrative functions may reside, for example, at an application layer level in protocol 228. The session layer at which connection management services may be performed is logically located above the TCP layer and the IP layer in protocol 228. Computer networking protocols that are based on TCP/IP and other similarly well-known, standards-based protocols may be referred to as open networks.

Example methods may be better appreciated with reference to the flow diagrams of FIGS. 3 through 7. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

Figure 3:
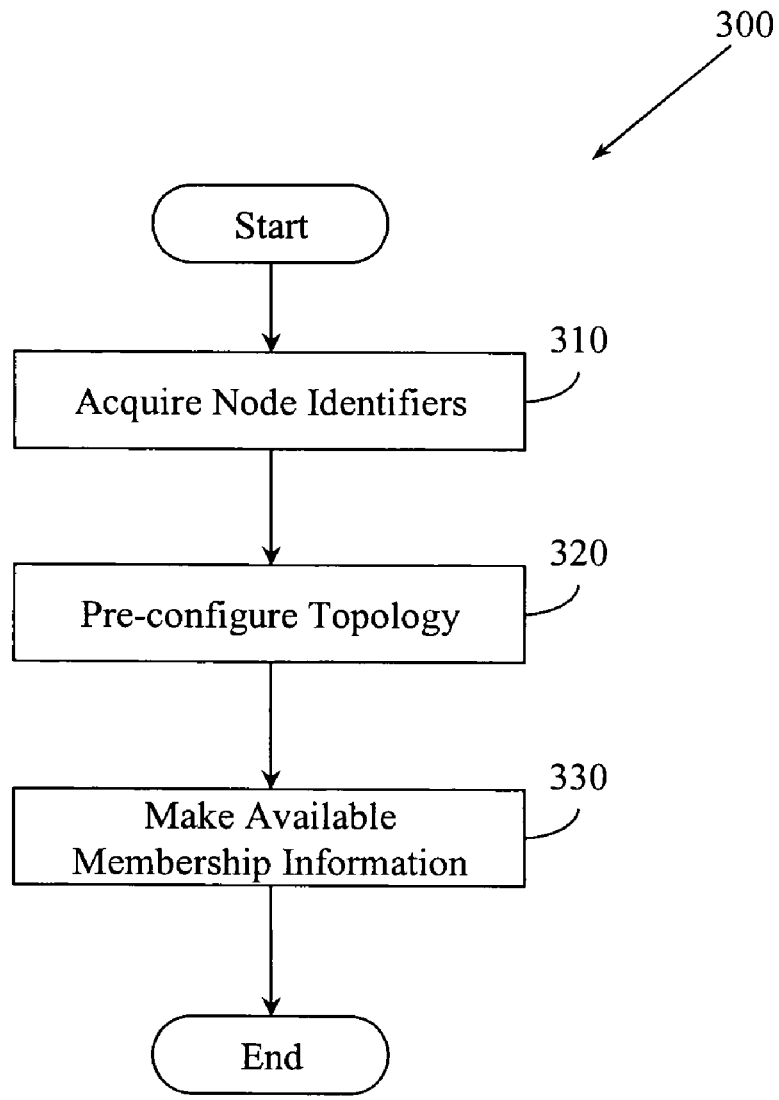
FIG. 3 illustrates an example method for establishing a pre-configured topology.

FIG. 3 illustrates an example method 300 for establishing a pre-configured topology. The method 300 may include, at 310, acquiring a set of node identifiers associated with nodes to be considered for inclusion in a pre-configured topology of nodes that can communicate within the topology using a preferred computer networking protocol. The preferred computer networking protocol may include, for example, a session layer in which connection management functions are performed, a TCP transport layer, and an IP network layer. In one example, the set of node identifiers are acquired from a human user through a GUI. As described above, a GUI is simply one example mechanism for establishing a topology. A node identifier may take forms including, but not limited to, an IP address, a value stored in a NIC, (e.g., in its hardware, firmware, and/or software), a value stored in an RNIC (e.g., in its hardware, firmware, and/or software), a password, a value stored on a USB token, and so on.

The method 300 may also include, at 320, establishing the pre-configured topology of nodes. Establishing the pre-configured topology of nodes may include, for example, establishing which nodes are members of the pre-configured topology, establishing a preferred computer networking protocol to be employed by members of the topology, establishing a preferred path to be employed for data communications between members of the topology, establishing a fallback networking protocol to be employed by members of the topology, establishing a fallback path to be employed for data communications between members of the topology, and recording the membership, protocols, paths, and so on in the membership data.

Having pre-configured the topology of nodes, the method 300 may proceed, at 330, by making available a membership data concerning the pre-configured topology of nodes. The membership data may be distributed to member nodes of the topology and/or acquired by the member nodes.

In one example, methodologies are implemented as processor executable instructions and/or operations stored on a computer-readable medium. Thus, in one example, a computer-readable medium may store processor executable instructions operable to acquire a set of node identifiers associated with nodes to be considered for inclusion in a pre-configured topology of nodes that can communicate within the topology using a preferred computer networking protocol or a fallback computer networking protocol. The method may also include establishing the pre-configured topology as described above. The method may also include making available a membership data concerning the pre-configured group of nodes. While this method is described being stored on a computer-readable medium, it is to be appreciated that other methods described herein may also be so stored.

Figure 4:
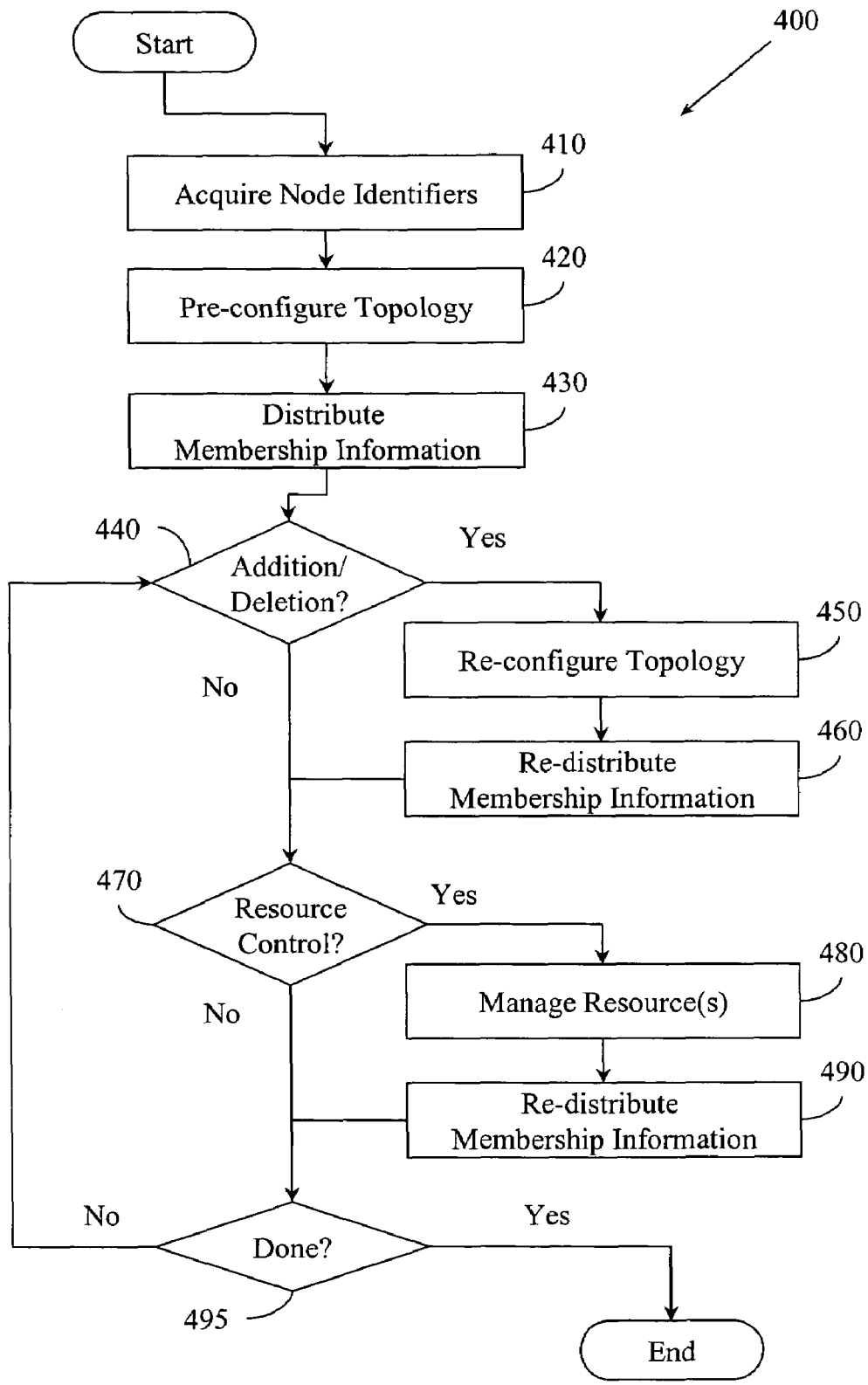
FIG. 4 illustrates an example method for establishing a pre-configured topology with session layer connection management.

FIG. 4 illustrates an example method 400 for establishing a pre-configured topology with session layer connection management. The method 400 may include, at 410, acquiring a set of node identifiers associated with nodes to be considered for inclusion in a pre-configured topology of nodes that can communicate within the topology using a preferred computer networking protocol and, if a port mapping request or connection request is denied based on membership or resource issues, using a fallback computer networking protocol. A node identifier may be, for example, an IP address, a value stored in a NIC, a value stored in an RNIC, a password, a value stored on a USB token, and so on.

The method 400 may include, at 420, pre-configuring the topology of nodes. Pre-configuring the topology of nodes may include, for example, determining which nodes are to be members of the pre-configured topology, establishing a preferred and fallback computer networking protocol to be employed by members of the topology, establishing a preferred and fallback path to be employed for data communications between members of the topology, recording information in the membership data, and the like.

Having pre-configured the topology, the method 400 may proceed, at 430, to distribute membership data to nodes that are in the pre-configured topology of nodes. While distributing the data is described at 430, it is to be appreciated that in one example member nodes may pull the data to themselves rather than having it pushed to them. While the actions described at 410 through 430 concern pre-configuring a topology, method 400 may also include dynamically reconfiguring the pre-configured topology.

Thus, at 440, a determination is made concerning whether there is a node to be added or deleted from the pre-configured topology of nodes. If the determination at 440 is Yes, then at 450, the method 400 includes selectively adding or deleting a node from the pre-configured topology of nodes and, at 460, in response to selectively adding or deleting the node, redistributing the membership data.

The method 400 may also address controlling connections between nodes based on topology membership in light of resource management. For example, an RNIC may have limited RDMA resources. If those resources are being used, then a request from an otherwise authorized node (e.g., a node that is a member of the pre-configured topology) may be denied based on resource considerations rather than membership concerns. Thus, at 470, a determination is made concerning whether there is a resource control action to be taken. If the determination at 470 is Yes, then at 480, the method 400 may include selectively managing a computer networking resource, and in response to selectively managing the computer networking resource, redistributing the membership data at 490. Resource control actions may include, for example, enabling a protocol off-load capability, aging off-loaded connections, converting idle connections to a non-off-load mode, and converting connections to and/or from RDMA mode.

At 495, a determination is made whether the method 400 is done. If the determination is No, then the method continues at an earlier action (e.g., 440), otherwise the method 400 may terminate.

Figure 5:
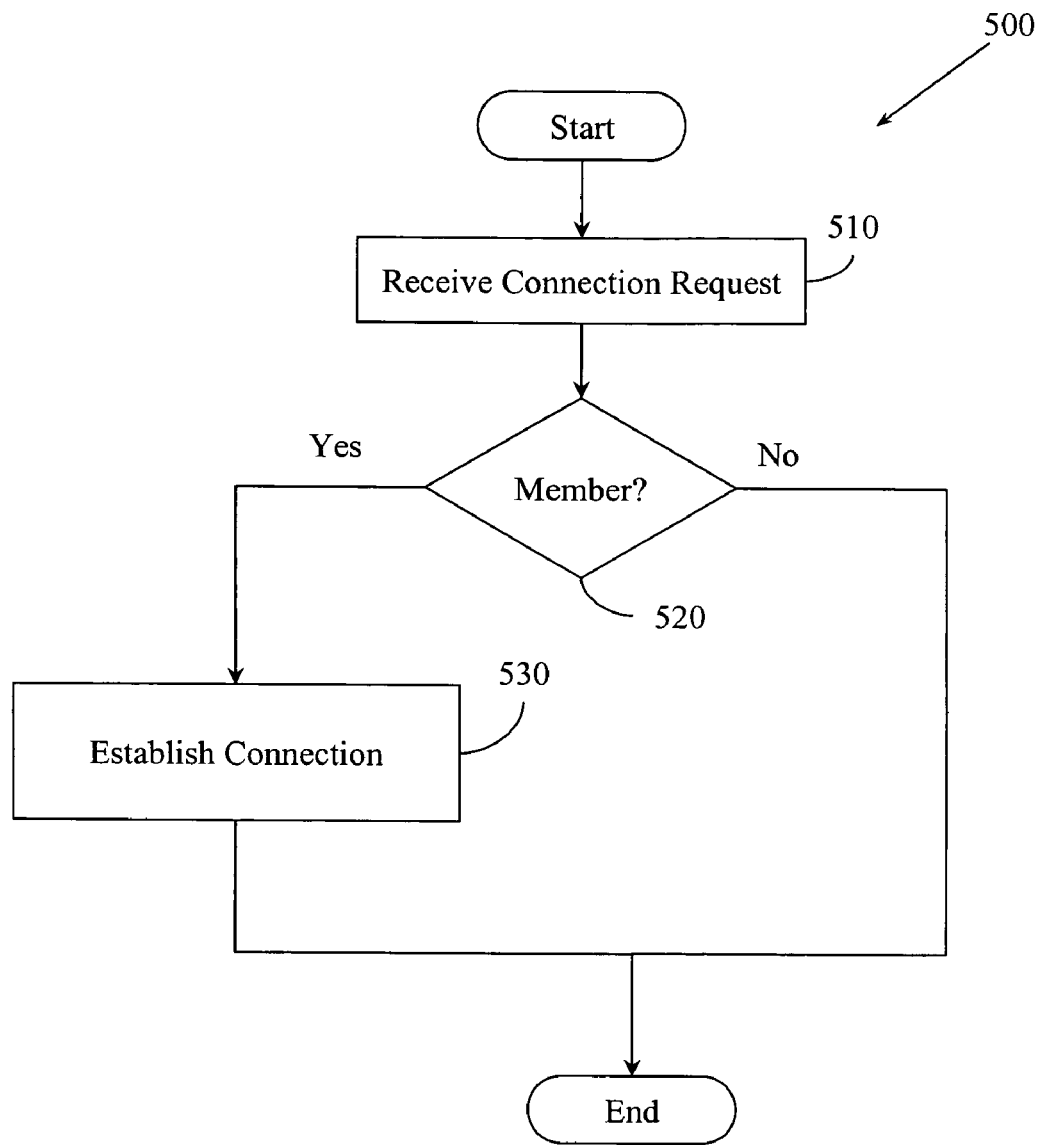
FIG. 5 illustrates an example server method for processing a connection request in a pre-configured topology.

FIG. 5 illustrates an example server method 500 for processing a connection request in a pre-configured topology. The method 500 may be performed, for example, by a session layer logic associated with a open computer networking protocol available to members of a pre-configured topology. The method 500 may include, at 510, the server receiving from a client node, via the open computer networking protocol, a request to establish a connection between the client node and the server node using the open computer networking protocol. In one example, the request may include a node identifier while in another example the client node may make a node identifier available for inspection.

The method 500 may also include, at 520, making a determination concerning whether the client node is a member of a pre-configured topology to which the server node belongs. In one example, the determination is made by examining a node identifier associated with the client node and topology data provided to the method 500 by an administrative interface. If the determination at 520 is Yes, then the method 500 may continue, at 530, with selectively establishing the connection between the client node and the server node via the open computer networking protocol.

Figure 6:
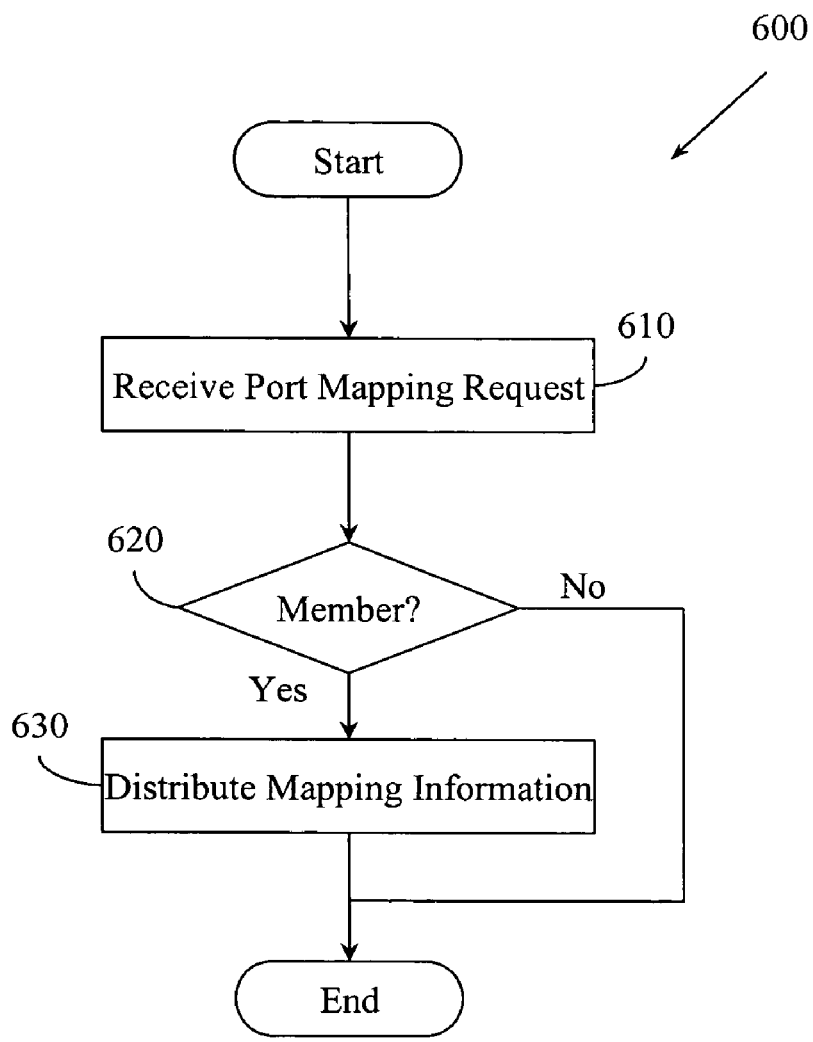
FIG. 6 illustrates an example server method for processing requests in a pre-configured topology with session layer connection management.

FIG. 6 illustrates an example server method 600 for processing requests in a pre-configured topology with session layer connection management. The method 600 may be performed, for example, in a server node. The method 600 may include, at 610, receiving from a client node a mapping request for a mapping data that describes a relationship between a resource on the server node and a port on the server node. In one example, the resource may be located on a server node RNIC, and the like. The resource may support functionality like RDMA between the client node and the server node, protocol off-loading on the server node, and the like. Where the terms client node and server node are employed herein, they relate to categorizing nodes that are making a request and nodes that are responding to the request. Nodes in a pre-configured topology may at one point in time act like a client node and at another point in time act like a server node depending on whether they are making or receiving a request. Thus, neither client nor server is intended to convey any limitations concerning hardware, firmware, and/or software associated with a node.

Method 600 may include, at 620, determining whether the node from which the mapping request was received is a member of a pre-configured topology to which the server node belongs. The determination may be made, for example, by examining a node identifier associated with the client node. If the determination at 620 is Yes, then at 630 the method 600 may selectively provide the mapping data to the client node.

Figure 7:
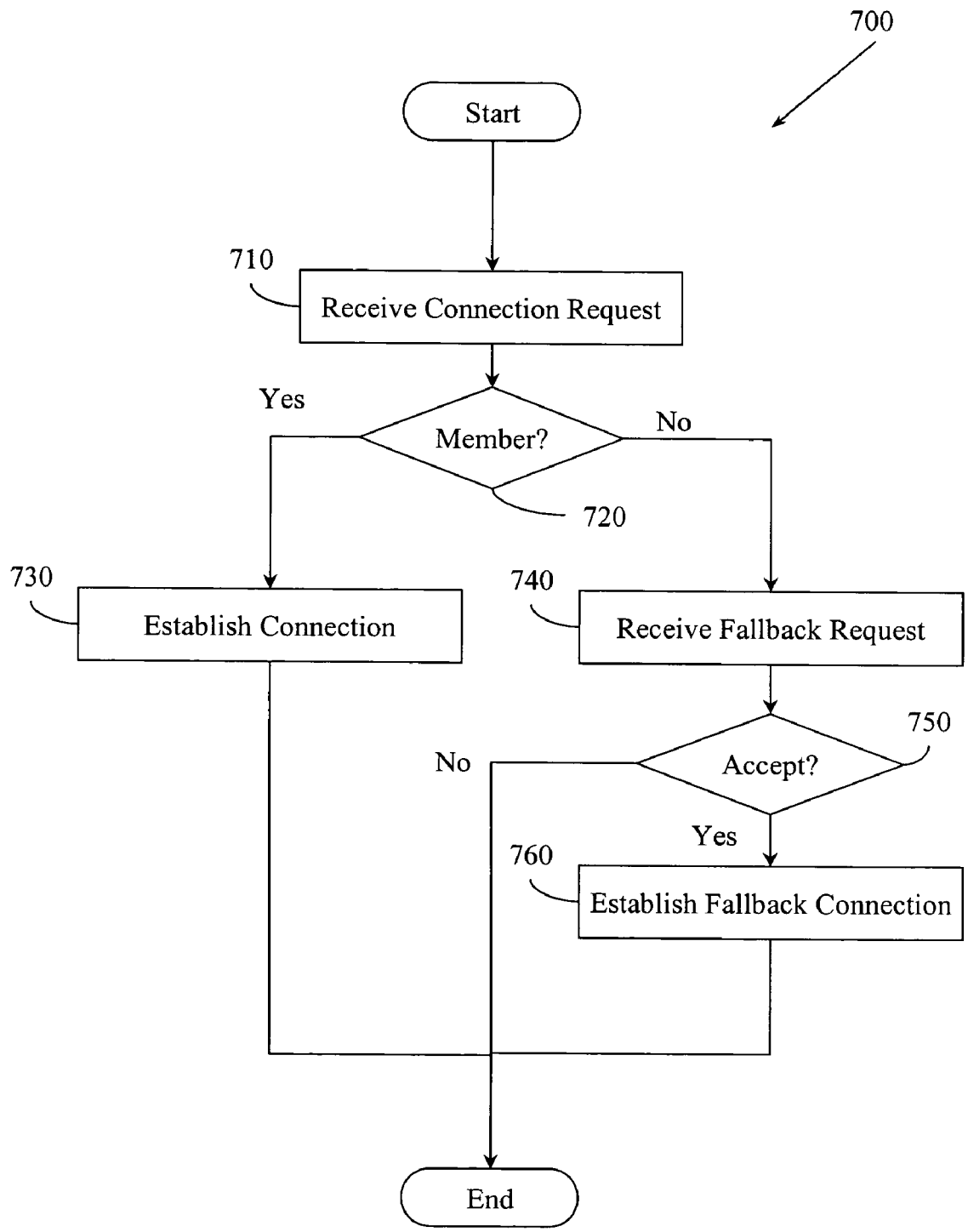
FIG. 7 illustrates another example server method for processing requests in a pre-configured topology with session layer connection management.

FIG. 7 illustrates an example server method 700 associated with processing connection requests. Method 700 may be performed, for example, in a server node. Method 700 may include, at 710, receiving a connection request from a client node. The request may seek to establish a connection between the client node and the server node via a first networking protocol that is available to members of the pre-configured topology.

At 720, a determination is made concerning whether the client node is a member of the pre-configured topology. If the determination is Yes, then at 730, the method 700 selectively establishes the connection. The determination may be based, for example, on whether the connection request included a unique identifier from the client node that identifies the client node as being a member of the pre-configured topology to which the server node belongs. In one example, even though the client node is a member, the connection may be refused. For example, based on factors like load, time of day, scheduled maintenance, and so on, an otherwise authorized node (e.g., member of pre-configured topology) may be denied a connection.

The method 700 may also include, at 740, receiving a fallback connection request from the client node. If the connection request was denied, or if the port mapping request was denied, and the client node still wishes to establish some form of communication with the server node, then the client node may request the fallback connection. The fallback connection request may ask that the fallback connection be established via a second networking protocol, where the fallback connection granted in response to the fallback connection request will not provide access to the resource via the first networking protocol.

At 750, a determination is made concerning whether to accept the fallback connection request. If the determination is Yes, then at 760 the fallback connection may be established. While method 700 illustrates an accept decision at 750, it is to be appreciated that method 700 may be implemented without the accept decision at 750.

While FIG. 7 illustrates various actions occurring in serial, it is to be appreciated that various actions illustrated in FIG. 7 could occur substantially in parallel. By way of illustration, a first process could receive connection requests, a second process could determine membership in a pre-configured topology, and a third process could establish connections. While three processes are described, it is to be appreciated that a greater and/or lesser number of processes could be employed and that lightweight processes, regular processes, threads, and other approaches could be employed. Similarly, while various actions are illustrated occurring in serial in FIGS. 3, through 7 it is to be appreciated that some actions illustrated therein could occur substantially in parallel.

Figure 8:
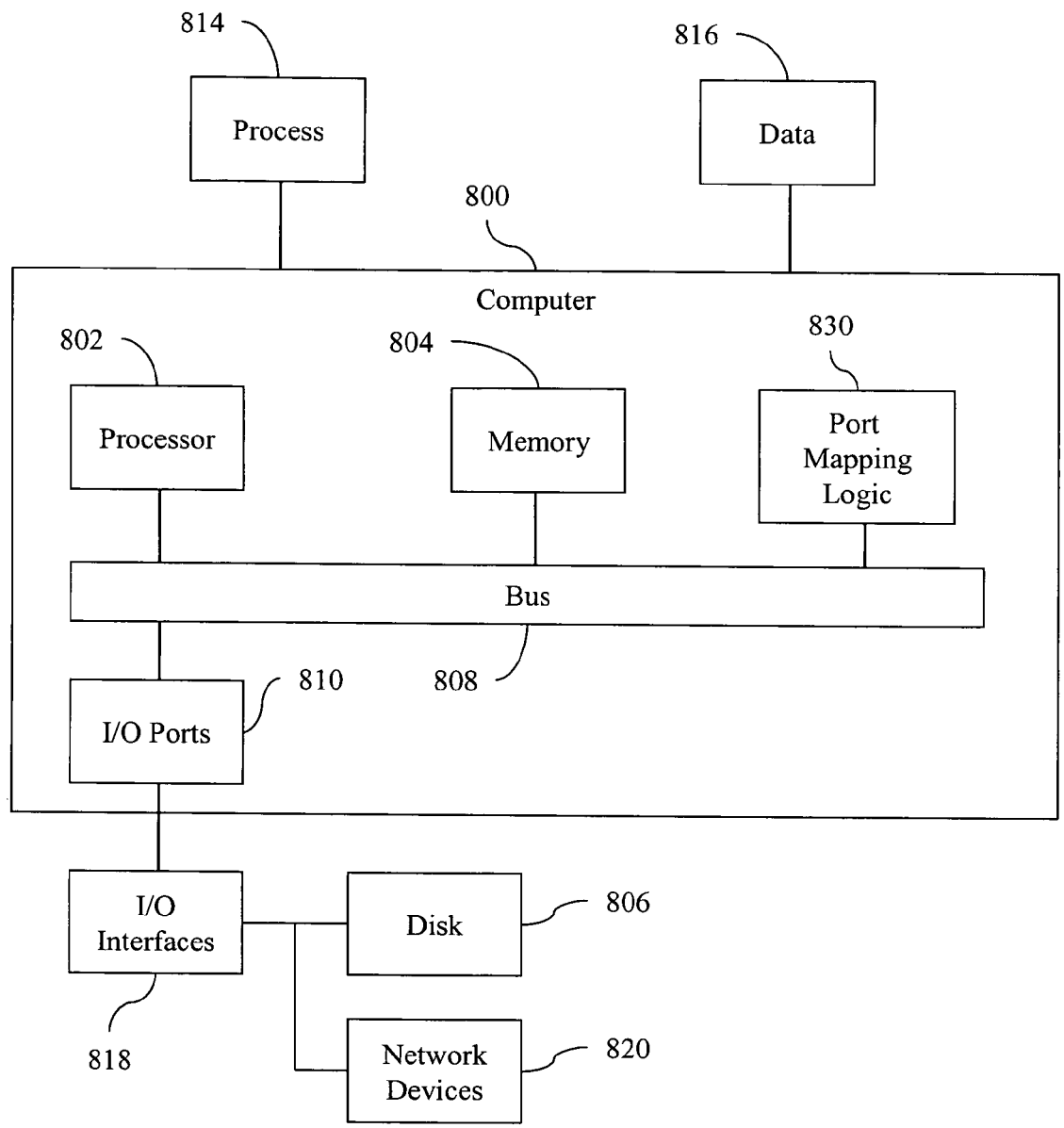
FIG. 8 illustrates an example computing environment in which example systems and methods illustrated herein can operate.

FIG. 8 illustrates a computer 800 that includes a processor 802, a memory 804, and input/output ports 810 operably connected by a bus 808. In one example, the computer 800 may include a port mapping logic 830 configured to facilitate connection management in a pre-configured topology. The port mapping logic 830 may perform connection management functions like determining whether to distribute port mapping information, determining whether to establish a connection via a desired protocol, and reclaiming or reconfiguring resources. While a port mapping logic 830 is illustrated, it is to be appreciated that a resource to port mapping logic (not illustrated) and other similar logics may perform the connection management functions separately and/or in conjunction with the port mapping logic 830. Furthermore, while the port mapping logic 830 is illustrated inside computer 800, it is to be appreciated that the port mapping logic 830 and/or a connection management logic (not illustrated) may be located in an input/output interface 818 and/or a network device 820 (e.g., NIC, RNIC).

The processor 802 can be a variety of various processors including dual microprocessor and other multi-processor architectures. The memory 804 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the computer 800 via, for example, an input/output interface (e.g., card, device) 818 and an input/output port 810. The disk 806 can include, but is not limited to, devices like a magnetic disk drive, a solid state disk drive, a floppy disk drive, a tape drive, a Zip drive, a flash memory card, and/or a memory stick. Furthermore, the disk 806 can include optical drives like a CD-ROM, a CD recordable drive (CD-R drive), a CD rewriteable drive (CD-RW drive), and/or a digital video ROM drive (DVD ROM). The memory 804 can store processes 814 and/or data 816, for example. The disk 806 and/or memory 804 can store an operating system that controls and allocates resources of the computer 800.

The bus 808 can be a single internal bus interconnect architecture and/or other bus or mesh architectures. While a single bus is illustrated, it is to be appreciated that computer 800 may communicate with various devices, logics, and peripherals using other busses that are not illustrated (e.g., PCIE, SATA, Infiniband, 1374, USB, Ethernet). The bus 808 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial bus (USB), and a small computer systems interface (SCSI) bus.

The computer 800 may interact with input/output devices via i/o interfaces 818 and input/output ports 810. Input/output devices can include, but are not limited to, a keyboard, a microphone, a pointing and selection device, cameras, video cards, displays, disk 806, network devices 820, and the like. The input/output ports 810 can include but are not limited to, serial ports, parallel ports, and USB ports.

The computer 800 can operate in a network environment and thus may be connected to network devices 820 via the i/o interfaces 818, and/or the i/o ports 810. Through the network devices 820, the computer 800 may interact with a network. Through the network, the computer 800 may be logically connected to remote computers. The networks with which the computer 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 820 can connect to WAN technologies including, but not limited to, point to point links, circuit switching networks like integrated services digital networks (ISDN), packet switching networks, and digital subscriber lines (DSL).

Figure 9:
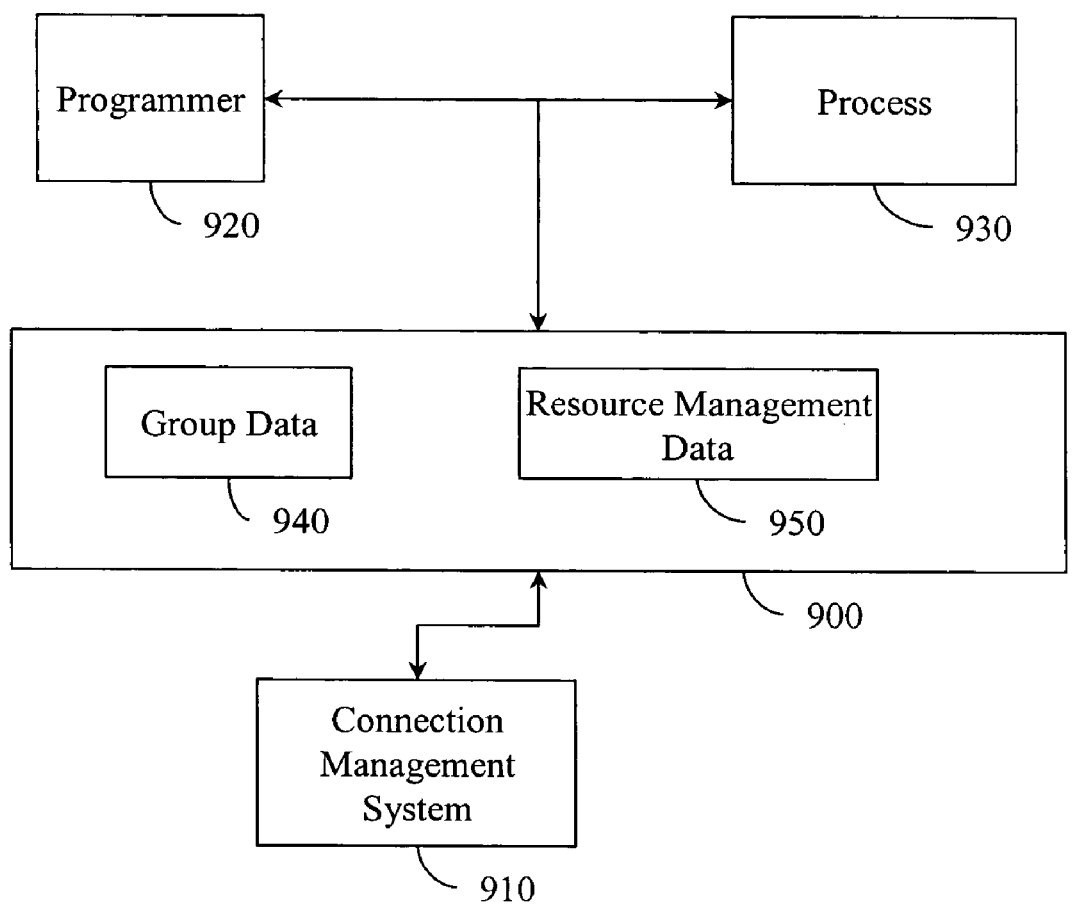
FIG. 9 illustrates an example application programming interface (API).

Referring now to FIG. 9, an application programming interface (API) 900 is illustrated providing access to a connection management system 910. The API 900 can be employed, for example, by a programmer 920 and/or a process 930 to gain access to processing performed by the connection management system 910. The processing may include, for example, pre-configured topology establishment, administrative control of pre-configured topologies, administrative control of resource handling, responding to port mapping requests, establishing connections between nodes in a pre-configured topology, and the like. A programmer 920 can write a program to access the system 910 (e.g., invoke its operation, monitor its operation, control its operation) where writing the program is facilitated by the presence of the API 900. Rather than programmer 920 having to understand the internals of the system 910, the programmer 920 merely has to learn the interface to the system 910. This facilitates encapsulating the functionality of the system 910 while exposing that functionality.

Similarly, the API 900 can be employed to provide data values to the connection management system 910 and/or to retrieve data values from the system 910. For example, a process 930 that establishes groups can provide the group data to the system 910 via the API 900 by, for example, using a call provided in the API 900. Thus, in one example of the API 900, a set of application programming interfaces can be stored on a computer-readable medium. The interfaces can be employed by a programmer, computer component, logic, and so on to gain access to a connection management system 910. The interfaces can include, but are not limited to, a first interface 940 that communicates a group data, where the group data facilitates determining whether a client node is a member of a pre-configured topology to which a server node belongs. The interfaces can also include a second interface 950 that communicates a resource management data, where the resource management data may facilitate controlling actions like when a connection is established based on resource availability, and how to reconfigure resources.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
an interface logic configured to pre-configure a topology of nodes to communicate via a preferred networking protocol;
a mapping logic connected to the interface logic, the mapping logic being configured to produce a mapping between a resource located on a first node and a port located on the first node, to selectively provide to a second node a mapping data that describes the mapping, and to selectively establish a connection that facilitates the second node accessing the resource through the port using the preferred networking protocol, the mapping logic being configured to facilitate establishing a fallback connection between the first node and the second node according to a second networking protocol, the second networking protocol being different from the first networking protocol, where the second node may request the fallback connection after the mapping logic has been controlled to not provide the mapping data to the second node or the mapping logic has been controlled to prevent the establishment of a connection between the first node and the second node using the first networking protocol; and
a connection management logic connected to the mapping logic and the interface logic, the connection management logic being configured to control whether the mapping logic will provide the mapping data and establish the connection, the connection management logic being configured to selectively block access to a first resource on the first node via the preferred networking protocol and to selectively permit access to a second resource on the first node via a fallback networking protocol.

2. The system of claim 1, where to pre-configure the topology of nodes the interface logic acquires a node identifier that facilitates recording whether a node is a member of a pre-configured topology, acquires a topology configuration choice data concerning how the pre-configured topology is to be configured, pre-configures the topology based, at least in part, on the node identifier and the topology configuration choice data, and provides a topology data concerning the topology to a member of the topology.

3. The system of claim 2, where the connection management logic exerts its control based, at least in part, on the topology data and a node identifier received from the second node.

4. The system of claim 2, where a node identifier comprises one or more of, an Internet Protocol (IP) address, a value stored in one or more of a network interface card (NIC) hardware, firmware, and software, a value stored in one or more of a remote direct memory access (RDMA) NIC (RNIC) hardware, firmware, and software, a password, and a value stored on a universal serial bus (USB) token.

5. The system of claim 2, where to pre-configure the topology of nodes, the interface logic determines which nodes are members of the topology, establishes a preferred computer networking protocol to be employed by members of the topology, establishes a preferred path to be employed for data communications between members of the topology, establishes a fallback networking protocol to be employed by members of the topology, and establishes a fallback path to be employed for communications between members of the topology.

6. The system of claim 2, where the topology data describes one or more of, which nodes are members of the topology, a preferred computer networking protocol to be employed between members of the topology, a preferred path to be employed for communications between members of the topology, a fallback networking protocol to be employed between members of the topology, and a fallback path to be employed for communications between members of the topology.

7. The system of claim 2, where the connection management logic exerts its control based on analyzing the topology data and one or more of, time of day, network traffic, load, and resource availability.

8. The system of claim 2, where the topology configuration choice data is received from one or more of, a user, a script, a policy, and a program.

9. The system of claim 1, where the configuration choice data is received from one or more of, a human user via a graphical user interface (GUI), a scripting-based system, and a policy-based system.

10. The system of claim 1, where the interface logic is further configured to control one or more resource control actions including, enabling a protocol off-load capability, aging off-loaded connections, converting idle connections to a non-off-load mode, and converting connections between an RDMA and a non-RDMA mode.

11. The system of claim 1, where the mapping logic comprises a port mapper configured to listen on a well-known port for one or more of, a request for mapping data, and a connection request.

12. The system of claim 1, where the resource supports one or more of, remote direct memory access (RDMA) between the first node and the second node, and protocol off-loading at the first node.

13. The system of claim 1, where one or more of, the interface logic, the mapping logic, and the connection management logic are located on one or more of, a network interface card (NIC), and a remote direct memory access (RDMA) NIC (RNIC).

14. The system of claim 1, where the connection management logic operates at a session layer associated with the first networking protocol.

15. The system of claim 14, where the first networking protocol includes a Transmission Control Protocol (TCP) transport layer and an Internet Protocol (IP) network layer.

16. A computer configured with a pre-configured topology connection management system, the system comprising:
an interface logic configured to pre-configure a topology of nodes to communicate via a preferred networking protocol or a fallback networking protocol, where to pre-configure the topology of nodes the interface logic acquires a node identifier that facilitates recording whether a node is a member of a pre-configured topology, acquires a topology configuration choice data concerning how the pre-configured topology is to be configured, pre-configures the topology based, at least in part, on the node identifier and the topology configuration choice data, and provides a topology data concerning the topology to a member of the topology;

a mapping logic connected to the interface logic, the mapping logic being configured to produce a mapping between a resource located on a first node and a port located on the first node, to selectively provide to a second node a mapping data that describes the mapping, and to selectively establish a connection that facilitates the second node accessing the resource through the port using the preferred networking protocol, the mapping logic being configured to facilitate establishing a fallback connection between the first node and the second node according to a second networking protocol, the second networking protocol being different from the first networking protocol, where the second node may request the fallback connection after the mapping logic has been controlled to not Provide the mapping data to the second node or the mapping logic has been controlled to prevent the establishment of a connection between the first node and the second node using the first networking protocol; and a connection management logic connected to the mapping logic and the interface logic, the connection management logic being configured to control whether the mapping logic will provide the mapping data and establish the connection, the connection management logic being configured to selectively block access to a first resource on the first node via the preferred networking protocol and to selectively permit access to a second resource on the first node via a fallback networking protocol, and where the connection management logic exerts its control based, at least in part, on the topology data and a node identifier received from the second node.

17. A method, comprising:

acquiring by an interface logic a set of node identifiers associated with nodes to be considered for inclusion in a pre-configured topology of nodes that communicate within the pre-configured topology of nodes using a preferred computer networking protocol;

establishing the pre-configured topology of nodes, to communicate via the preferred networking protocol;

producing a mapping between a resource located on a first node and a port located on the first node;

selectively providing to a second node a mapping data that describes the mapping;

selectively establishing a connection that facilitates the second node accessing the resource through the port using the preferred networking protocol;

establishing a fallback connection between the first node and the second node according to a second networking protocol, the second networking protocol being different from the first networking protocol, where the second node may request the fallback connection after the mapping logic has been controlled to not provide the mapping data to the second node or the mapping logic has been controlled to prevent the establishment of a connection between the first node and the second node using the first networking protocol;

controlling whether the mapping logic will provide the mapping data and establish the connection;

selectively blocking access to a first resource on the first node via the preferred networking protocol;

selectively permitting access to a second resource on the first node via a fallback networking protocol; and making available a membership data concerning the pre-configured topology of nodes.

18. The method of claim 17, where the set of node identifiers are acquired from one or more of, a human user through a graphical user interface (GUI), a scripting-based system, and a policy-based system.

19. The method of claim 18, where a node identifier comprises one or more of, an Internet Protocol (IP) address, a value stored in a network interface card (NIC) hardware, a value stored in a NIC firmware, a value stored in a NIC software, a value stored in a remote direct memory access (RDMA) NIC (RNIC) hardware, a value stored in an RNIC firmware, a value stored in an RNIC software, a password, and a value stored on a USB (Universal Serial Bus) token.

20. The method of claim 17, where establishing the pre-configured topology of nodes includes:

determining node membership in the pre-configured topology;

establishing a preferred computer networking protocol to be employed by members of the topology;

establishing a preferred path to be employed for communications between members of the topology;

establishing a fallback computer networking protocol to be employed by members of the topology;

establishing a fallback path to be employed for communications between members of the topology; and recording the topology membership, preferred computer networking protocol, preferred path, fallback computer networking protocol, and fallback path in the membership data.

21. A computer-readable medium storing processor executable instructions operable to perform a method, the method comprising:

acquiring by an interface logic a set of node identifiers associated with nodes to be considered for inclusion in a pre-configured topology of nodes that communicate within the topology using a preferred computer networking protocol or a fallback computer networking protocol;

establishing the pre-configured topology of nodes, where establishing the pre-configured topology of nodes includes determining node membership in the pre-configured topology, establishing the preferred computer networking protocol to be employed by members of the topology, establishing a preferred path to be employed for communications between members of the topology, establishing a fallback computer networking protocol to be employed by members of the topology, establishing a fallback path to be employed for communications between members of the topology, and recording the topology membership, preferred computer networking protocol, preferred path, fallback computer networking protocol, and fallback path in the membership data;

selectively blocking access to a first resource on the first node via the preferred networking protocol;

selectively permitting access to a second resource on the first node via a fallback networking protocol; and making available a membership data concerning the pre-configured topology of nodes.

22. A method, comprising:

acquiring by an interface logic a set of node identifiers associated with nodes to be considered for inclusion in a pre-configured topology of nodes that communicate within the topology using a preferred computer networking protocol;

establishing the pre-configured topology of nodes;
pre-configuring a topology of nodes to communicate via the preferred networking protocol;
producing a mapping between a resource located on a first node and a port located on the first node;
selectively providing to a second node a mapping data that describes the mapping;
selectively establishing a connection that facilitates the second node accessing the resource through the port using the preferred networking protocol;
establishing a fallback connection between the first node and the second node according to a second networking protocol, the second networking protocol being different from the first networking protocol, where the second node may request the fallback connection after the mapping logic has been controlled to not provide the mapping data to the second node or the mapping logic has been controlled to prevent the establishment of a connection between the first node and the second node using the first networking protocol;
selectively blocking access to a first resource on the first node via the preferred networking protocol;
selectively permitting access to a second resource on the first node via a fallback networking protocol; and
distributing a membership data concerning the pre-configured topology of nodes to nodes that are in the pre-configured topology of nodes;
selectively adding or deleting a node from the pre-configured topology of nodes and, in response to selectively adding or deleting the node, redistributing the membership data; and
selectively managing a computer networking resource, and in response to selectively managing the computer networking resource, redistributing the membership data.

23. The method of claim 22, where a node identifier comprises one or more of, an Internet Protocol (IP) address, a value stored in a network interface card (NIC) hardware, a value stored in a NIC firmware, a value stored in a NIC software, a value stored in a remote direct memory access (RDMA) NIC (RNIC) hardware, a value stored in an RNIC firmware, a value stored in an RNIC software, a password, and a value stored on a USB token.

24. The method of claim 22, where establishing the pre-configured topology of nodes includes:
determining node membership in the pre-configured topology;
establishing a preferred computer networking protocol to be employed by members of the topology;
establishing a preferred path to be employed for communications between members of the topology;
establishing a fallback computer networking protocol to be employed by members of the topology;
establishing a fallback path to be employed for communications between members of the topology; and
recording the group membership, preferred computer networking protocol, preferred path, fallback computer networking protocol, and fallback path in the membership data.

25. The method of claim 22, where selectively managing a computer networking resource includes one or more of, enabling a protocol off-load capability, aging an off-loaded connection, converting an idle connection to a non-off-load mode, and converting a connection between an RDMA mode and a non-RDMA mode.

26. A method, comprising:
in a first node, receiving from a second node, via a preferred computer networking protocol, a request to establish a connection between the first node and the second node via the preferred computer networking protocol, where the connection facilitates the second node accessing a resource associated with the first node;
determining whether the second node is a member of a pre-configured topology that includes the first node by examining a node identifier associated with the second node; and
selectively not establishing the connection between the first node and the second node via the preferred computer networking protocol if it is determined that the second node is not a member of the pre-configured topology that includes the first node;
selectively blocking access to a first resource on the first node via the preferred networking protocol; and
selectively permitting access to a second resource on the first node via a fallback networking protocol.

27. The method of claim 26, where the method is performed by a session layer logic associated with the open computer networking protocol.

28. The method of claim 26, where the open computer networking protocol includes a Transmission Control Protocol (TCP) transport layer and an Internet Protocol (IP) network layer.

29. A computer-readable medium storing processor executable instructions operable to perform a method, the method comprising:
in a session layer logic in a first node, receiving from a second node, via a preferred computer networking protocol that includes a Transmission Control Protocol (TCP) transport layer and an Internet Protocol (IP) network layer, a request to establish a connection between the first node and the second node via the preferred computer networking protocol, where the connection facilitates the second node accessing a resource associated with the first node;
determining whether the second node is a member of a pre-configured topology that includes the first node; and
selectively not establishing the connection between the first node and the second node via the preferred computer networking protocol if it is determined that the second node is not a member of the pre-configured topology that includes the first node;
selectively blocking access to a first resource on the first node via the preferred networking protocol; and
selectively permitting access to a second resource on the first node via a fallback networking protocol.

30. A method, comprising:
in a first node, receiving from a second node via a preferred networking protocol a mapping request for a mapping data that describes a relationship between a resource on the first node and a port on the first node;
selectively providing the mapping data to the second node based on determining that the second node is a member of a pre-configured topology that includes the first node by examining a node identifier associated with the second node;
receiving from the second node a connection request to establish a connection between the first node and the second node via a first networking protocol, where the connection facilitates accessing the resource;
selectively establishing the connection based on determining that the second node is a member of a pre-configured topology that includes the first node by examining a node identifier associated with the second node; and via a second networking protocol, receiving from the second node a fallback connection request to establish a fallback connection between the first node and the second node, where the fallback connection request requests that the fallback connection be established via the second networking protocol, where the fallback connection granted in response to the third request will not provide access to the resource via the first networking protocol;

selectively blocking access to a first resource on the first node via the preferred networking protocol; and selectively permitting access to a second resource on the first node via a fallback networking protocol.

31. The method of claim 30, where selectively establishing the connection is based additionally on an availability of the resource.

32. The method of claim 30, where the resource is located on one or more of, a network interface card (NIC), and a remote direct memory access (RDMA) NIC (RNIC) associated with the first node.

33. The method of claim 30, where the resource supports one or more of remote direct memory access (RDMA) between the first node and the second node, and protocol off-loading at the first node.

34. The method of claim 30, where the first networking protocol includes a Transmission Control Protocol (TCP) transport layer and an Internet Protocol (IP) network layer.

35. A computer-readable medium storing processor executable instructions operable to perform a method, the method comprising:

in a first node, receiving from a second node via a preferred networking protocol a mapping request for a mapping data that describes a relationship between a resource on the first node and a port on the first node;

selectively providing the mapping data to the second node based on determining, by examining a node identifier associated with the second node, that the second node is a member of a pre-configured topology that includes the first node;

receiving from the second node a connection request to establish a connection between the first node and the second node via a first networking protocol, where the connection facilitates accessing the resource;

selectively establishing the connection based on determining that the second node is a member of a pre-configured topology that includes the first node by examining a node identifier associated with the second node; and via a second networking protocol, receiving from the second node a fallback connection request to establish a fallback connection between the first node and the second node, where the fallback connection request requests that the fallback connection be established via the second networking protocol, where the fallback connection granted in response to the third request will not provide access to the resource via the first networking protocol;

selectively blocking access to a first resource on the first node via the preferred networking protocol; and selectively permitting access to a second resource on the first node via a fallback networking protocol.

36. A system, comprising:

means for determining via a preferred networking protocol whether a client node is a member of a pre-configured topology to which a server node belongs;

means for rejecting a request that will lead to the undesired consumption of a server resource if the requesting client node is not a member of the pre-configured topology to which the server node belongs;

means for establishing a connection between the client node and the server node using a networking protocol preferred by members of the pre-configured topology;

means for producing a mapping between a resource located on a first node and a port located on the first node;

means for selectively providing to a second node a mapping data that describes the mapping, means for selectively establishing a connection that facilitates the second node accessing the resource through the port using the preferred networking protocol;

means for establishing a fallback connection between the first node and the second node according to a second networking protocol, the second networking protocol being different from the first networking protocol, where the second node may request the fallback connection after the mapping logic has been controlled to not provide the mapping data to the second node or the mapping logic has been controlled to prevent the establishment of a connection between the first node and the second node using the first networking protocol; and means for blocking access to a first resource on the first node via the preferred networking protocol; and means for permitting access to a second resource on the first node via a fallback networking protocol.

* * * * *